United States Patent [19]

Plut et al.

[11] Patent Number: 5,101,272

[45] Date of Patent: Mar. 31, 1992

[54] DUAL BANDWIDTH/GAIN VIDEO PREAMPLIFIER

[75] Inventors: Leonard F. Plut, Concord Township; Robert J. Vagi, Broadview Heights, both of Ohio

[73] Assignee: Picker International, Inc., Highland Hts., Ohio

[21] Appl. No.: 392,479

[22] Filed: Aug. 11, 1989

Related U.S. Application Data

[63] Continuation-in-part of Ser. No. 203,510, May 25, 1988, Continuation of Ser. No. 936,470, Nov. 25, 1986.

[51] Int. Cl.$^5$ .................... H04N 7/01; H04N 7/12; H04N 5/268
[52] U.S. Cl. ............................ 358/137; 358/181; 358/140
[58] Field of Search ............ 378/99; 358/184, 140, 358/141, 11, 137, 174, 181, 136

[56] References Cited

U.S. PATENT DOCUMENTS

| | | | |
|---|---|---|---|
| 3,567,854 | 3/1971 | Tschantz et al. | 358/11 |
| 4,204,225 | 5/1980 | Mistretta | 378/99 |
| 4,303,940 | 12/1981 | Ciciora | 358/140 |
| 4,527,197 | 7/1985 | Nolte | 358/168 |
| 4,543,605 | 9/1985 | Verhoeven | 378/99 |
| 4,573,183 | 2/1986 | Relihun | 378/99 |
| 4,574,279 | 3/1986 | Roberts | 358/140 |
| 4,581,635 | 4/1986 | Franke | 378/99 |
| 4,665,427 | 5/1987 | Beckley et al. | 358/11 |
| 4,719,644 | 1/1988 | Herzog et al. | 358/140 |
| 4,739,390 | 4/1988 | Achiha et al. | 358/11 |
| 4,881,124 | 11/1989 | Yokouchi et al. | 378/99 |
| 4,910,592 | 3/1990 | Shroy, Jr. et al. | 358/174 |
| 4,922,916 | 5/1990 | Ermert et al. | 378/99 |
| 4,924,487 | 5/1990 | Nishiki | 378/99 |
| 4,930,144 | 5/1990 | Plut et al. | 378/99 |
| 4,939,577 | 7/1990 | Schreurs | 358/140 |

FOREIGN PATENT DOCUMENTS 8600483 1/1986 Japan .................... 358/168

*Primary Examiner*—Victor R. Kostak
*Assistant Examiner*—Jeffrey S. Murrell
*Attorney, Agent, or Firm*—Fay, Sharpe, Beall, Fagan, Minnich & McKee

[57] ABSTRACT

A TV camera (22) generates a low level video signal which represents a sensed image pattern from an image intensifier (18). A preamplifier circuit (24) boosts the low level video signal. The preamplifier is selectively switched between feedback paths (74,76) to select the gain of the preamplifier, and between various filter paths (84,88) to select the bandwidth. Various display processing components such as a digital acquisition system (42) and video tape or video disc recorder (44) are provided to process video signals from the preamplifier circuit. A monitor (26) containing circuitry to generate synchronization signals, to adjust brightness, to adjust images aspect ratio, and to adjust image resolution is provided to convert the video signals into a man readable display. A video switch (40) selectively routes the video signals from the preamplifier to one of the display processing components and from these components to the monitor. The route, the gain, and the bandwidth are controlled by input from a console (30).

17 Claims, 2 Drawing Sheets

DUAL BANDWIDTH/GAIN VIDEO PREAMPLIFIER

This application is a continuation in part of application Ser. No. 203,510 filed May 25, 1988 which is a continuation of application Ser. No. 936,470, filed Nov. 25, 1986.

BACKGROUND OF THE INVENTION

The present invention relates to the art of amplifying video signals. The invention finds particular application in conjunction with fluoroscopic/radiographic medical imaging systems and will be described with particular reference thereto. However, it is to be appreciated that the invention will also find application in multi-rate scan video camera systems with remotely selectable dual bandwidth/gain video preamplifiers.

In an x-ray fluoroscopic/radiographic imaging system, a radiation source directs x-rays through a patient onto an input surface of an image intensifier tube. The image intensifier tube converts a relatively large area of x-rays into a relatively small brightened visual image which corresponds to the x-ray pattern emerging from the patient. The image from the image intensifier tube is converted to a video signal by a video camera.

In the fluoroscopic/radiographic imaging system, the video signals from the video camera can be used in a variety of manners. First, the video signals can be sent directly to a viewing monitor which produces an image. In another option, the video signals can be directed to a variety of display processing components including digital acquisition systems, video tape recorders, and video disc recorders. These components digitize, enhance, and store the video signals so that they may be played back on a monitor at a later time.

One feature of these multi-mode diagnostic imaging systems is the different parameters which must be accommodated in changing modes. For example, a standard fluoroscopy mode employs a 525 lines per screen image. Whereas a high resolution radiographic mode employs a 1049 lines per screen image. Numerous adjustments, such as brightness, must be made for visual compatibility as a function of which line rate is selected. In playing back the stored information, the aspect of the monitor produced image is typically changed from a 1:1 to a 4:3 aspect ratio. Depending upon the mode selection, various degrees of resolution are obtained. These differing parameters are accommodated by adjustments to the monitor to produce an acceptable video image. In the past, one manner to satisfy these varying requirements was to create a system containing multiple monitors, each being preset for the operation in accordance with the various combination of parameters necessary for each operating mode. The parent applications disclose a system that employs a single monitor with associated control circuitry capable of displaying images from the various operating modes.

One of the problems encountered when forcing a plurality of modes into a common display format, is that some modes have a more unfavorable signal to noise ratio in the display format. Specifically, in the medical field, the video camera tube is commonly operated in three modes; (1) an interlace mode with 60 frames per second, (2) a non-interlaced progressive mode operating at 30 frames per second, and (3) a non-interlaced progressive mode at 7.5 frames per second. The slower third mode normally has significantly more image deterioration than the first two modes.

The present invention contemplates a new and improved camera system and method which over comes the above referenced image deterioration problems and others.

SUMMARY OF THE INVENTION

In accordance with one aspect of the present invention, a multi-rate video system is provided. A camera generates low level video signals which represent a sensed image pattern. A preamplifier circuit, which includes a gain selecting means and a bandwidth selecting means, boosts the low level video signals. A video recorder selectively records and replays video signals from the preamplifier circuit and a data acquisition means selectively processes video signals from the preamplifier circuit. A monitor containing circuitry to generate synchronization signals, to adjust brightness, to adjust aspect ratio, and to adjust image resolution is provided. The monitor is used to convert the video signals into a man readable display. A video switch selectively routes the video signals from the preamplifier circuit to the monitor, the recorder or the data acquisition means and from the recorder or data acquisition means to the monitor. A console is provided for selectively controlling the video switch, the gain selecting means and the bandwidth selecting means.

In accordance with another aspect of the present invention, a diagnostic imaging system is provided having a source of radiation. A multi-mode detecting means detects radiation patterns. A selecting means selects one of the operating modes of the multi-mode detecting means. A preamplifier circuit selectively amplifies the low level video signals in accordance with the operating mode selected by the selecting means. A monitor receives the video signals and produces a man-readable image of the radiation pattern represented by the video signals. The image is in a raster format where the operating mode is selected in accordance with the number of raster lines in the raster format. An adjusting means adjusts the brightness of the image produced by the monitor as a function of the number of lines of the display image.

One advantage of the present invention is that it improves the signal-to-noise ratio.

Another advantage of the present invention is an improved dynamic range for the post amplifiers. The video gain for amplifiers after the preamplifier is unaltered.

Yet another advantage of the present invention is that it provides for a remotely selectable dual bandwidth-/dual gain video preamplifier.

Still further advantages will be apparent to those of ordinary skill in the art upon reading and understanding the following detailed description of the preferred embodiment.

BRIEF DESCRIPTION OF THE DRAWINGS

The invention may be embodied in various steps and arrangements of steps and in various components and arrangements of components. The drawings are only for purposes of illustrating a preferred embodiment and are not to be construed as limiting the invention.

DETAILED DESCRIPTION OF THE PREFERRED EMBODIMENT

Figure 1:
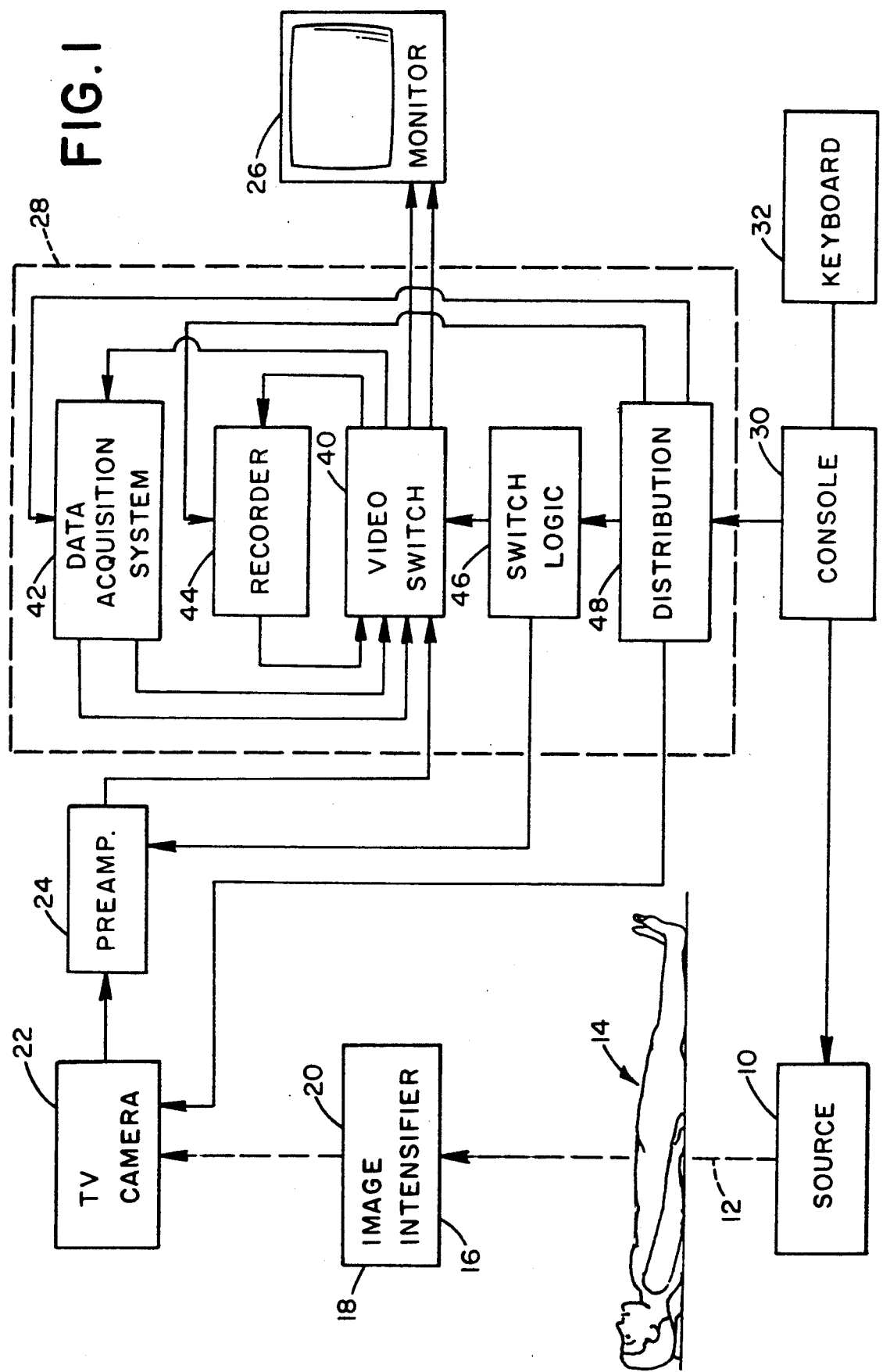
FIG. 1 is a block diagram illustrating image acquisition, preamplification, storage and monitoring components of a diagnostic imaging system in accordance with the present invention.

With reference to FIG. 1, a diagnostic imaging system incorporating the present invention is presented in generalized form. The system includes a source of penetrating radiation 10 directed along a path 12. The path causes the radiation source to pass through a patient 14 and to impinge upon an input face 16 of an image intensifier tube 18. The x-rays from the source which have passed through the patient 14 emerge and impinge upon the intensifier tube's input face 16 in a unique radiation pattern. The image tube 18 converts the relatively large area of x-rays into a smaller, relatively bright visual image corresponding to the x-ray pattern which emerged from the patient, at the image tube's output face 20.

A television camera 22 receives light output from the output face 20 of image tube 18. The camera 22 produces analog video signals, including synchronization information, which represent the viewed image. The video signals, which are low level signals, are processed in a preamplifier means or circuit 24 which boosts the low level video signals up to more readily usable values and selectively filters the amplified signals removing unused bandwidths.

The video and synchronization signals can be transmitted directly to a monitor 26 for display. Alternatively, a video signal processing subsystem 28 may enhance or process the signals before they are sent to the monitor 26.

A console 30 having an attached keyboard 32 controls and selects whether the video signal is to be transmitted directly to the monitor 26 from camera 22 or is to be transmitted to one of the other processing or memory sections located in the video signal processing subsystem 28 and thereafter sent to monitor 26.

Looking in greater detail to the video processing subsystem 28, the video signal outputted from the television camera 22 and the preamplification circuitry 24 is transmitted to an input of a multi-input, multi-output video switch unit 40. Other inputs of the video switch unit 40 are connected to the outputs of a digital acquisition system 42 and a video recorder 44. Outputs of video switch unit 40 are connected to the inputs of the digital acquisition system 42, the video recorder unit 44, and the monitor 26. The video switch unit 40 conveys both video signals and control signals to the monitor 26.

The video switch unit 40 allows any of its inputs to contact any of its outputs without video termination problems. The selection of the video path through the switch unit 40 depends on which of the modes of operation is selected for the system.

The console 30 interfaces the video processing subsystem 28 by a multi-conductor cable which is interfaced to a programmable switch logic circuit 46 by way of a system signal distribution circuit 48. The output from the programmable switch logic circuit 46 is inputted into the preamplifier circuit 24 to select its gain and bandwidth in accordance with the operating mode chosen at console 30. In an alternative to this method, a separate programmable switching unit (not shown) can be associated with the preamplification circuitry 24 and signals from the distribution circuitry 48 can be fed directly into this separate programmable switch.

Figure 2:
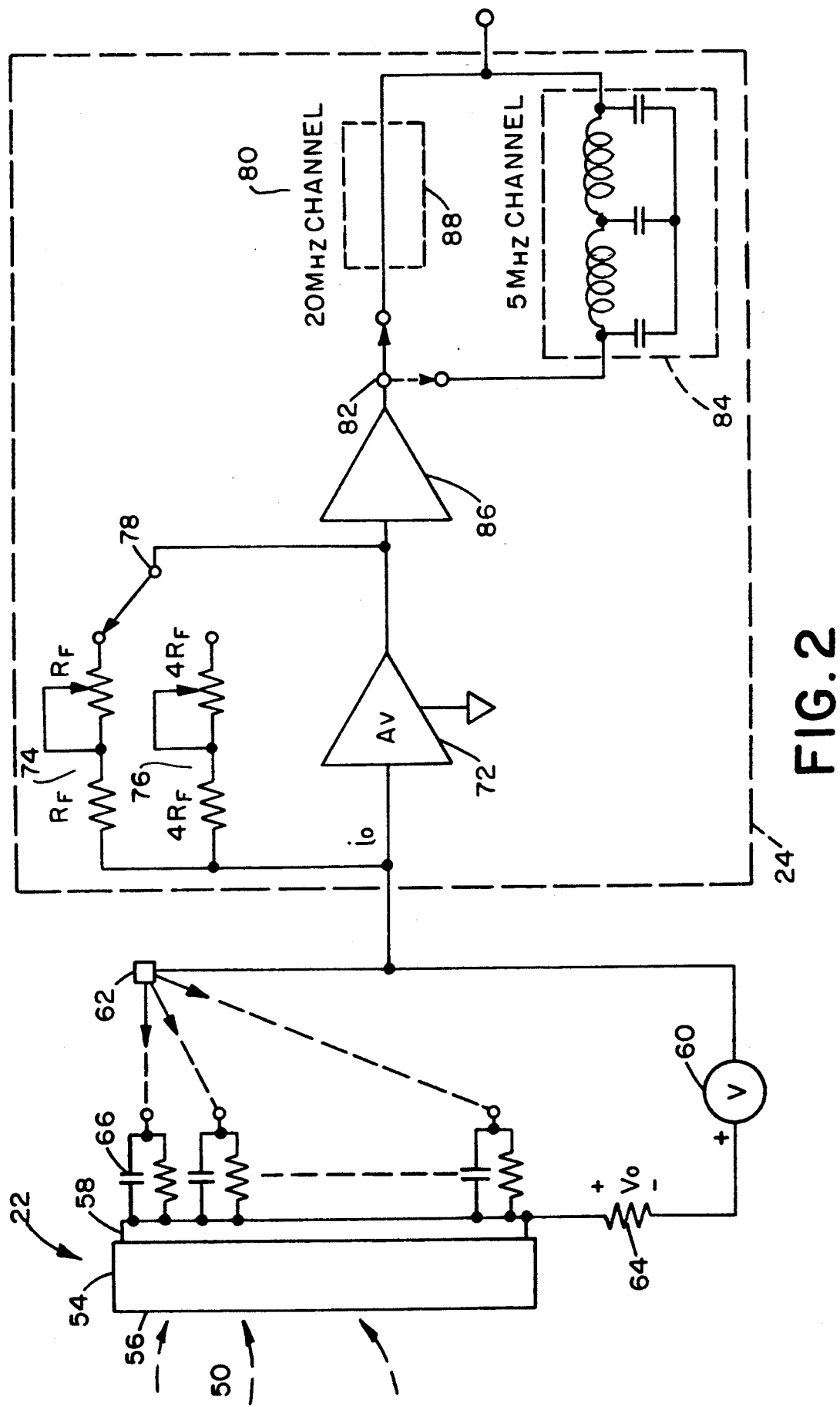
FIG. 2 is a schematic diagram of portions of the camera and selectable dual gain/dual bandwidth video preamplifier of FIG. 1.

With reference to FIG. 2, light rays 50 in the form of the image pattern of the intensifier tube 18 impinge on a target 54 of the camera 22. The target 54 generally consists of a transparent signal electrode, such as a glass plate 56, located on the front face of the tube and a thin layer of photoconductive material 58 applied at the rear of the glass plate 56. The photoconductive material 58 serves two main purposes. It is a light sensitive element, and it forms the storage surface for the electrical charge pattern that corresponds to the light image from the intensifier tube 18, falling on the glass plate 56. The photoconductive material 58 has a large resistance when no light is impinging on its surface. Light falling on the conductive material excites electrons into a conducting state, thereby lowering the resistance of the photoconductive material at the point of illumination.

A positive voltage 60 is applied to one side of the photoconductive layer. On the other side, the scanning beam 62 scans the backside of the target 54. In the interval between successive scans of a particular spot, the light rays 50 lower the resistance of the photoconductive material 58 in relation to its intensity. Current then flows through the surface at this point, and the back surface builds up a positive voltage until the beam returns to scan the point again. The signal output current is generated when the beam deposits electrons on these positively charged areas. An equal number of electrons flow out of the signal electrode and through a load resistor 64 which converts the current output video signal to a voltage output video signal Vo. A corresponding output current $i_0$ is fed directly to a preamplification circuit 24. When the photoconductive material is dark and its resistance is high, proportionally more current flows to the preamplifier.

Applying light to the photoconductive material reduces the resistance in that area thereby discharging the voltage which has built up on capacitor elements 66. Thereafter, when the scanning beam senses a low voltage, current will flow through the scanning beam to recharge the capacitor to applied voltage rather than to the preamplifier.

The current $i_0$ outputted to the preamplifier circuitry 24 is defined by the relationship $i_0 = C\, de/dt$ which can be simplified to algebra as: $i_0 = Ce/\Delta t$, where $i_0$ = current out to preamplifier system;
C = the lump capacitance of the entire conductive target;
e = the voltage across the capacitor; and,
$\Delta t$ = the time to scan the target area.

As previously noted, in the preferred diagnostic imaging system, and in many other uses in the medical field, three types of scanning procedures are used: (1) an interlaced mode with 60 fields per second, (2) a non-interlaced progressive mode with 30 frames per second, and (3) a progressive mode with 7.5 frames per second.

The first two procedures cause no change in time during scanning. Both operate at the standard 30 frames per second. The third, 7.5 frames per second, which is used in digital radiography, does change the time per scan. Specifically, such a change alters the $\Delta t$ from the above equation. Under the conventional 7.5 frames per second procedure, only a quarter of the signal current for a given light condition is passed to the preamplifier circuitry 24, thereby, deteriorating the signal-to-noise ratio by a factor of 4.

All real components, including those of the present preamplifier, have thermal noise which is represented by:

$$v_n = \sqrt{4KtR\Delta f}$$

where
- $v_n$ = rms noise voltage
- K = Boltzmann's constant ($1.37 \times 10^{-23}$)
- t = Absolute temperature, (°Kelvin),
- $\Delta f$ = Noise bandwidth, (Hz),
- R = Resistance (ohms).

This equation reduces at room temperature to:

$$v_n = \sqrt{KR\Delta f}$$

Note that the signal-to-noise ratio of a system is improved as R increases.

A trans-impedance amplifier 72 generates a voltage proportional to the input current $i_0$. The input current is amplified and a voltage is produced of an appropriate amplitude for producing video images of the subject 14.

A first feedback resistance 74 and a second feedback resistance 76, both of which can be variable resistors, are selectively switched into the circuit by a feedback resistance switch 78. When the system is switched to the radiographic mode, 7.5 frames per second, the feedback switch 78 puts the second feedback resistances 76 into the feedback loop. The second feedback resistance is four (4), times the first feedback resistance 74—the same ratio as the 7.5 frames per second mode to the 30 frames per second mode. In the preferred embodiment, 1 megohm and 4 megohm feedback paths are provided. Quadrupling the resistance quadruples the gain and voltage output, thereby making it equivalent to the voltage output of the 30 frames per second mode. The additional resistance also increases the noise by approximately the square root of 4, i.e. a factor of 2. Because the signal increased is by 4 and the noise is increased by only 2, the signal-to-noise ratio is approximately doubled.

To accommodate camera system scan requirements in terms of vertical frame times, overall system bandwidth and gain is regulated to a maximum of 2 microamps at 20 MHz for a system operating at 30 frames per second and 0.5 microamps at 5 MHz for a system operating at 7.5 frames per second.

The present invention further improves the signal to noise ratio by recognizing that noise is uniformly distributed throughout the frequency range. The preamplifier has a 20 MHz bandwidth to accommodate the 30 frames per second signal. But the 7.5 frames per second signal only takes advantage of 5 MHz of the available bandwidth. The present invention improves the signal-to-noise ratio with a bandwidth selecting means 80. Specifically, when the operating mode using 7.5 frames per second is selected, a second selector switch 82 switches in the 5 MHz band pass filter 84 which filters a signal received from a voltage buffer amplifier section 86 of the preamplifier 24, so that only the 5 MHz bandwidth is passed. This eliminates the unused three-fourths of the 20 MHz bandwidth hence three-fourths of the noise.

When operating in the 30 frames per second mode, the switch 82 selects a path 88 that allows 20 mHz to pass. When the bandwidth of the preamplifier components is selected at 20 mHz, the 20 mHz path may be a conductor. When the noise generated in the preamplifier is equivalent to 45 db at 20 mHz and keeping in mind that the contribution due to increased thermal noise of the 4 megohm resistor is small compared to the noise of the input of the first amplifier stage, the following improvements may be noticed.

| DESIGN EQUATION/PARAMETER | 20 MHZ CASE w/1 megohm | 5 MHZ CASE w/4 megohm (w/1 megohm)** |
|---|---|---|
| 1) e(signal) = I(in) × R(feedback) [terminated at output] | 1 V = 2 ua × 1 meg | 1 V = 0.5 ua × 4 meg (.25 V = .5 ua × 1 meg)** |
| 2) R(in) = ½pi × f × c | 796 ohm = R(in) | 3184 ohm = R(in) (796 ohm = R(in))** |
| 3) A(loop) = R(feedback)/R(in) | 1256 = 1 meg/796 ohm | 1256 = 4 meg/3148 ohm (1256 = 1 meg/796 ohm)** |
| 4) e(noise) = (nv/(H 0.5)) × A(loop) | e(noise) = 6 mv | e(noise) = 6 mv (e(noise) = 6 mv)** |
| 5) e(out) = e(signal) + e(noise) | e(out) = 1 v + 6 mv | e(out) = 1 v + 6 mv (e(out) = 1 v + 6 mv)** |
| 6) Z(transfer) = e(out)/I(in) | Z(trans) = 1 v/2 ua | Z(trans) = 1 v/0.5 ua (Z(trans) = .25 v/.5 ua)** |
| 7) signal to noise - preamp only | 45 db | 45 db (45 db)** |
| 8) frequency response of input | 20 mhz | 5 mhz (20 mhz)** |
| 9) frequency response of preamp | 20 mhz | 20 mhz (20 mhz)** |
| 10) signal to noise - system overall with post bandwidth filter | 45 db | 63 db (51 db)** |

**indicates prior art case

In operation, the operator selects either a fluoroscopic mode or a radiographic mode on the console keyboard. When the fluoroscopic mode is selected, the switch logic unit 46 operates switches 78 and 82 to connect the 1 megohm feedback resistor path 74 and the 20 MHz filter path 88. When the radiographic or 7.5 frames per second mode is selected, the switch logic unit 46 operates switches 78 and 82 to connect the 4 megohm feedback resistor path 76 and the 5 MHz bandpass filter 84. Selecting the 4 megohm feedback resistor over the 1 megohm feedback resistor and the 5 MHz filter over the 20 MHz path effects a 12 db noise improvement. It is to be appreciated that it is possible, using the apparatus and method of the present invention to provide a manner in which the selected feedback may be changed without changing the bandwidth or in the alternative changing the bandwidth without changing the feedback.

The invention has been described with reference to a preferred embodiment. Obviously, modifications and alterations will occur to others of ordinary skill in the art upon reading and understanding the preceding specification. It is intended that the invention be construed as including all such alterations and modifications insofar as they come within the scope of the appended claims or the equivalents thereof.

Having thus described the preferred embodiment, the invention is now claimed to be:

1. A multi-rate video system comprising:
   a camera for generating low level video signals representing a sensed image pattern;
   a preamplifier circuit for boosting the low level video signals;
   a gain selecting means including:
     a plurality of feedback resistors;
     a feedback resistor switching means for selectively connecting at least one of the feedback resistors into a feedback path;
   a bandwidth selecting means for selecting a bandwidth of signals from the preamplifier circuit;
   a video recorder for selectively recording and replaying video signals from the preamplifier circuit;
   a data acquisition means for selectively processing the video signals from the preamplifier circuit;
   a monitor means for converting the video signals into a man-readable display;
   a video switch means for selectively routing the video signals from the preamplifier circuit to a selected one of the monitor means, the recorder, and the data acquisition means and from a selected one of the preamplifier circuit, the recorder, and the data acquisition means to the monitor means;
   a console for selectively controlling the video switch means, the gain selecting means, and the bandwidth selecting means.

2. A multi-rate video system comprising:
   a camera for generating low level video signals representing a sensed image pattern;
   a preamplifier circuit for boosting the low level video signals;
   a gain selecting means for selecting a gain of the preamplifier circuit;
   a bandwidth selecting means including:
     a plurality of filter paths;
     a filter switching means for selectively connecting at least one of the filter paths with an output of the preamplifier circuit whereby a bandwidth of the video signals leaving the preamplifier circuit is selectable;
   a video recorder for selectively recording and replaying video signals from the preamplifier circuit;
   a data acquisition means for selectively processing the video signals from the preamplifier circuit;
   a monitor means for converting the video signals into a man-readable display;
   a video switch means for selectively routing the video signals from the preamplifier circuit to a selected one of the monitor means, the recorder, and the data acquisition means and from a selected one of the preamplifier circuit, the recorder, and the data acquisition means to the monitor means;
   a console for selectively controlling the video switch means, the gain selecting means, and the bandwidth selecting means.

3. A selectable, multiple gain/multiple bandwidth preamplifier system comprising:
   a preamplifier input that is adapted to be connected with a current source;
   at least one amplification stage operatively connected with the preamplifier input;
   a plurality of feedback resistors;
   a feedback resistor switching means for selectively connecting the feedback resistors into a feedback path around the amplification stage to select gain;
   a plurality of filter paths, each filter path passing a selected bandwidth; and
   a filter switching means for selectively connecting the filter paths with an amplification stage to select bandwidth.

4. The preamplifier system of claim 3 wherein the plurality of feedback resistors are variable resistors.

5. The preamplifier system of claim 3 wherein the plurality of feedback resistors include at least a first and a second feedback resistor, the second feedback resistor being four times the first.

6. The preamplifier system of claim 3 wherein the filter switching means switches between a first filter path which passes a bandwidth of generally 5 MHz and a second path that passes a bandwidth of generally 20 MHz.

7. The preamplifier system of claim 3 wherein a first of the filter paths has a decreased bandwidth relative to a second of the filter paths such that switching to the first filter path results in a decrease in system bandwidth and in a proportional decrease in system noise.

8. A diagnostic imaging system comprising:
   a camera means for producing low level video signals representing a diagnostic image, the camera means having a plurality of preselected operating modes;
   a filtering means for selectively filtering the video signals with one of a plurality of preselected filter functions, each filter function corresponding to one of the preselected operating modes;
   a monitor means for converting the video signals into a man-readable representation of the diagnostic image in a raster format which has one of a preselected number of lines, each preselected number of lines corresponding to one of the preselected operating modes; and,
   an adjusting means for adjusting a brightness of said man-readable representation produced by said monitor means; and
   a selecting means for selecting one of the preselected operating modes, the selecting means, the filtering means, the monitor means, and the adjusting means being operatively connected such that the filtering means selects the filter function in direct response to the preselected number of raster lines which are used with the selected operating mode, and the adjusting means adjusts the brightness of the man-readable representation in accordance with the selected operating mode.

9. A diagnostic imaging system comprising:
   a camera means operable in at least first and second modes for generating a video signal with a first number of raster lines per image in the first mode, and a second number of raster lines per image in the second mode;
   a preamplifier means for amplifying the video signal from the camera means with a preamplifier gain, the preamplifier means amplifying video signals with frequency components over a preamplifier bandwidth;
   a changing means for changing the preamplifier gain in response to changing from the first mode to the second mode, the changing means including:

a least first and second feedback paths; and, a feedback switching means for switching between the first and second feedback paths in response to changing between the first and second modes.

10. A diagnostic imaging system comprising:

a camera means operable in at least first and second modes for generating a video signal with a first number of raster lines per image in the first mode, and a second number of raster lines per image in the second mode;

a preamplifier means for amplifying the video signal from the camera means with a preamplifier gain, the preamplifier means amplifying video signals with frequency components over a preamplifier bandwidth;

a changing means for changing at least the preamplifier bandwidth in response to changing from the first mode to the second mode, the changing means including:

at least first and second filter paths which pass first and second bandwidths, respectively;

a filter switching means for switching between the first and second filter paths in response to changing between the first and second modes.

11. The diagnostic imaging system as set forth in claim 10 wherein the changing means further includes:

at least first and second feedback paths; and, a feedback switching means for switching between the first and second feedback paths in response to changing between the first and second modes.

12. The diagnostic imaging system as set forth in claim 11 wherein the first and second feedback paths include first and second feedback resistors, respectively, a ratio of a resistance of the second feedback resistor to a resistance of the first feedback resistor is substantially the same as a ratio of the first number of raster lines to the second number of raster lines.

13. The diagnostic imaging system as set forth in claim 12 wherein a ratio of the first bandwidth to the second bandwidth is substantially the same as the ratio of the first number of raster lines to the second number of raster lines.

14. The diagnostic imaging system as set forth in claim 10 wherein a ratio of the first bandwidth to the second bandwidth is substantially the same as a ratio of the first number of raster lines to the second number of raster lines.

15. A method of diagnostic imaging comprising:

converting patterns of radiation to video signals which represent the patterns;

selecting a number of raster lines per image of the video signals;

amplifying the video signals with a selected gain;

selectively passing the video signals to one of first and second filter paths which limit the video signal to one of first and second bandwidths, respectively, in accordance with selected number of raster lines per image;

converting the video signals to a man-readable display of the radiation pattern.

16. A method of diagnostic imaging comprising:

converting patterns of radiation to video signals which represent the patterns;

selecting a number of raster lines per image of the video signals;

amplifying the video signals with a selected gain;

feeding back a portion of the amplified video signals through one of first and second feedback paths to adjust the selected gain, in accordance with selected number of raster lines per image;

limiting the video signals to a selected bandwidth;

converting the video signals to a man-readable display of the radiation pattern.

17. A method of diagnostic imaging comprising:

converting patterns of radiation to video signals which represent the patterns;

selecting between a first number of raster lines and a second number of raster lines per image of the video signals;

amplifying the video signals with a selected gain;

limiting the video signals to a selected bandwidth;

changing the gain and bandwidth in accordance with a ratio of the first and second numbers of raster lines;

converting the video signals to a man-readable display of the radiation pattern.

* * * * *